(12) United States Patent
Tethal

(10) Patent No.: US 10,105,920 B2
(45) Date of Patent: Oct. 23, 2018

(54) METHOD OF MANUFACTURING A THERMOPLASTIC LAMINATE INCORPORATING A DIFFRACTIVE OPTICAL ELEMENT

(71) Applicant: IQ STRUCTURES S.R.O., Husinec-Rez (CZ)

(72) Inventor: Tomas Tethal, Husinec Rez (CZ)

(73) Assignee: IQ Structures S.R.O. (CZ)

( * ) Notice: Subject to any disclaimer, the term of this patent is extended or adjusted under 35 U.S.C. 154(b) by 0 days.

(21) Appl. No.: 15/306,275

(22) PCT Filed: Apr. 23, 2014

(86) PCT No.: PCT/CZ2014/000042
§ 371 (c)(1),
(2) Date: Oct. 24, 2016

(87) PCT Pub. No.: WO2015/161834
PCT Pub. Date: Oct. 29, 2015

(65) Prior Publication Data
US 2017/0043546 A1    Feb. 16, 2017

(51) Int. Cl.
| | |
|---|---|
| G02B 5/18 | (2006.01) |
| B29D 11/00 | (2006.01) |
| B32B 27/08 | (2006.01) |
| B29C 59/02 | (2006.01) |
| B32B 3/26 | (2006.01) |

(Continued)

(52) U.S. Cl.
CPC ........ B29D 11/0073 (2013.01); B29C 59/026 (2013.01); B32B 3/263 (2013.01); B32B 3/266 (2013.01); B32B 3/30 (2013.01); B32B 27/08 (2013.01); B42D 25/21 (2014.10); B42D 25/324 (2014.10); B42D 25/328 (2014.10); B42D 25/425 (2014.10); B42D 25/455 (2014.10); G02B 5/1814 (2013.01); G02B 27/4233 (2013.01); B29K 2069/00 (2013.01); B29K 2995/0097 (2013.01); B29L 2009/00 (2013.01); B32B 2307/418 (2013.01); B32B 2425/00 (2013.01)

(58) Field of Classification Search
CPC ...... G02B 5/18; G02B 5/1847; G02B 5/1852; G02B 5/1861; G02B 5/1866; G02B 27/42
USPC ....... 359/1, 2, 558, 566, 567, 569, 570, 572, 359/573, 574, 575, 576; 283/72, 86, 94, 283/107
See application file for complete search history.

(56) References Cited

U.S. PATENT DOCUMENTS

| | | | |
|---|---|---|---|
| 6,627,286 B1 * | 9/2003 | Lutz | B44C 1/1729 29/17.1 |
| 2015/0362642 A1 * | 12/2015 | Nagano | G02B 5/02 283/72 |

* cited by examiner

*Primary Examiner* — Arnel C Lavarias
(74) *Attorney, Agent, or Firm* — Taylor Russell & Russell, P.C.

(57) ABSTRACT

A method of manufacturing laminate, including at least a carrying layer (1) and a cover layer (5) each of thermoplastic material bonded together with a diffractive optical element (2) incorporated between them, the method including the steps of: providing a layer (2) having a different refractive index from that of the carrying layer (1) or the cover layer (5) and placing the layer (2) on the carrying layer (1), wherein the layer (2) is placed only in some areas of the carrying layer (1); imprinting a stamp (4) with optical diffractive relief (6) thereon into the layer (2); placing the cover layer (5) on the layer (2); and heating the resulting laminate to a temperature at which bonding of the cover layer (5) and the carrying layer (1) occurs.

6 Claims, 6 Drawing Sheets

(51) Int. Cl.
  *B32B 3/30* (2006.01)
  *B42D 25/21* (2014.01)
  *B42D 25/324* (2014.01)
  *B42D 25/328* (2014.01)
  *B42D 25/425* (2014.01)
  *B42D 25/455* (2014.01)
  *G02B 27/42* (2006.01)
  *B29K 69/00* (2006.01)
  *B29L 9/00* (2006.01)

METHOD OF MANUFACTURING A THERMOPLASTIC LAMINATE INCORPORATING A DIFFRACTIVE OPTICAL ELEMENT

TECHNICAL FIELD

The invention relates to a method of manufacturing a laminate having at least two layers of thermoplastic material, with a diffractive optical element incorporated between them. The method comprises covering a carrying layer of thermoplastic material with a layer having a different index of refraction from that of the carrying layer and/or a cover layer of thermoplastic material which is applied onto the carrying layer. The invention also pertains to a laminate having at least two layers of thermoplastic material with a diffractive optical element incorporated between these layers.

PRIOR ART

There exist various laminates comprising at least two layers of thermoplastics, that are transparent at least in some places, and have a diffractive optical element between these layers. The diffractive optical element serves as protection against falsification. Examples thereof include identification cards, credit/debit cards, passports, etc.

Incorporation of the diffractive optical element between two layers of thermoplastic material protects the element against mechanical damage, destruction by chemical agents, moisture and also eliminates the influence of UV radiation.

First of all, a diffractive optical element is placed on the surface of a thermoplastic foil which is subsequently placed between other thermoplastic foils and the final product is made by lamination of the foils under elevated temperature.

There are several options for how to place the diffractive optical element on the surface of the thermoplastic foil.

For instance, one option is by a hot stamping process, where a thin polymer foil having a thickness of several microns is applied onto the thermoplastic foil surface carrying the diffractive optical element.

Another option is by placing or sticking-in a thin carrying foil, typically having a thickness of several microns, on which is applied a polymer layer having a thickness of several microns and containing the diffractive optical element.

However, both of the above methods require both sides of the polymer layers incorporated or applied in any other manner to be treated with an adhesive suitable for subsequent lamination with thermoplastic material of which the final structure is composed, or alternatively the material of these incorporated or applied layers should be easy to laminate with other thermoplastic layers in the course of final lamination.

Generally, lamination of thermoplastic structures is conducted at temperatures up to 200° C. The materials of the final laminate must not be affected in terms of strength, colours, etc after completion of the lamination process. Therefore, selection of suitable materials used for the production of protective elements is limited. This is why some manufacturers use protective elements made of materials resistant to the conditions of lamination (e.g. metal) for their thermoplastic products. Also, the protective element structure is not compact, i.e. it is made with holes or channels therein. In the course of final structure lamination, melted thermoplastic material flows through these holes in the protective element, hence the entire structure is well fixed within the thermoplastic product, without additional adhesives. This procedure is described, for instance, in EP2331323A, WO2008/060918, U.S. Pat. No. 4,313,984, FR2638120 and U.S. Pat. No. 3,802,101.

For increased safety, protective diffractive optical elements can be produced in such a manner that the entire protective element surface is made of small segments placed so close to each other that the visual impact of the entire protection element is not significantly affected and, at the same time, the space between the segments provides channels for thermoplastic material to flow during the lamination process. In this way, the final protective element is appropriately fixed within the final structure and cannot be taken off, replaced or handled without being damaged.

Protective elements of this type are described in EP2393653A. According to this description, the entire pattern of a diffractive protective element is imprinted in one layer of a thermoplastic foil, and then only small surfaces of individual segments are covered with fixing material (e.g. metal). Consequently, the diffraction structure of the protective element is only preserved on small surfaces of individual segments, with thermoplastic material flowing through spaces between the segments, thus providing for fixation of the protective element.

However, the diffraction structure of the protective element is damaged in spaces between the segments, thus reducing the optical value of the protective element, particularly its brightness and sharp contours. The contours of the protective element are more or less visually affected by spaces between the segments, which also can adversely affect the size of protective element details, and, hence, place increased requirements on visual observation quality, e.g. more intensive light is needed. The size and position of spaces between the segments must also be considered in the composition of the protective element so that its image can be easily identified.

The visual deterioration effect can be suppressed by reduction of the spaces between the segments. However, this effect cannot be entirely eliminated, due to the protective element segmentation.

The object of this invention is to design an improved manufacturing procedure for a thermoplastic laminate with a diffractive optical element which eliminates the drawbacks of existing technology.

SUMMARY OF THE INVENTION

The object specified above is achieved by a method of manufacturing a laminate having at least two layers of thermoplastic material bonded together, with a diffractive optical element incorporated between them. The method comprises covering a surface of a carrying layer of thermoplastic material with a layer whose index of refraction differs from that of the carrying layer and/or a cover layer of thermoplastic material. The layer with a different index of refraction is placed only in some areas of the carrying layer. Subsequently a stamp with optical diffractive relief is imprinted in the layer with a different index of refraction, and the cover layer of thermoplastic material is put on the layer with a different index of refraction.

Finally, the material is heated to a temperature allowing the cover layer and the carrying layer to be bonded together.

In this application, the layer whose index of refraction differs from that of the carrying layer and/or the cover layer of thermoplastic material is designated as a "layer with a different index of refraction". After imprinting by the stamp, this layer with a different index of refraction provides the diffractive optical element.

An advantage of this invention is the elimination of the requirement to put a ready-made diffractive optical element between carrying and cover layers, as this element could be damaged by high temperatures necessary for the subsequent bonding of both layers (i.e. carrying and cover layers). Another advantage of embodiments of this invention is an improvement of the visual quality of the diffractive optical element, despite segmentation of its surface.

In order to achieve improved fixation of the stamped diffractive optical element, it is desirable in some embodiments if the optical diffractive relief on the stamp imprinted in the layer with a different index of refraction is, at least in some places, high enough to produce micro-fissures in the layer with a different index of refraction, in the step of imprinting by the stamp.

Another advantageous embodiment is one in which the layer with a different index of refraction is perforated (at least in some places) by the imprinting by the stamp with optical diffractive relief, in accordance with the relief of the stamp, thus allowing improved fixation of the final diffractive optical element.

Another advantageous embodiment is one in which a part of the material with a different index of refraction is detached from the layer with a different index of refraction and stamped optical diffractive relief by the imprinting by the stamp with optical diffractive relief, and this detached material of the layer with a different index of refraction is pressed deeper into the carrying layer than non-detached parts of the layer with a different index of refraction.

Height segmentation of the resulting diffractive optical element cannot be seen with the naked eye after finalization of the lamination process. However, a multi-level structure of diffractive optical elements of this type is advantageous, since it can be distinguished on the final product when looking at it closely, so that it can be utilized as an additional protective element.

Another advantageous embodiment is one in which the stamping of the layer with a different index of refraction is performed in a plurality of steps, using a plurality of different stamps.

The object as specified above can also be achieved by production of a laminate comprising at least two thermoplastic layers bonded together, with an intermediate layer therebetween having a different index of refraction from that of the carrying layer and/or the cover layer of thermoplastic material, the layer with a different index of refraction constituting a diffractive optical element, wherein the layer with a different index of refraction has micro-fissures and/or perforations and/or a detached part resulting from the imprinting by at least one stamp with optical diffractive relief, thus enabling thermoplastic material of the cover layer to flow therethrough and provide for bonding together of the cover layer and carrying layer.

BRIEF DESCRIPTION OF THE DRAWINGS

In the accompanying drawings.

DESCRIPTION OF PREFERRED EMBODIMENTS

Figure 1:
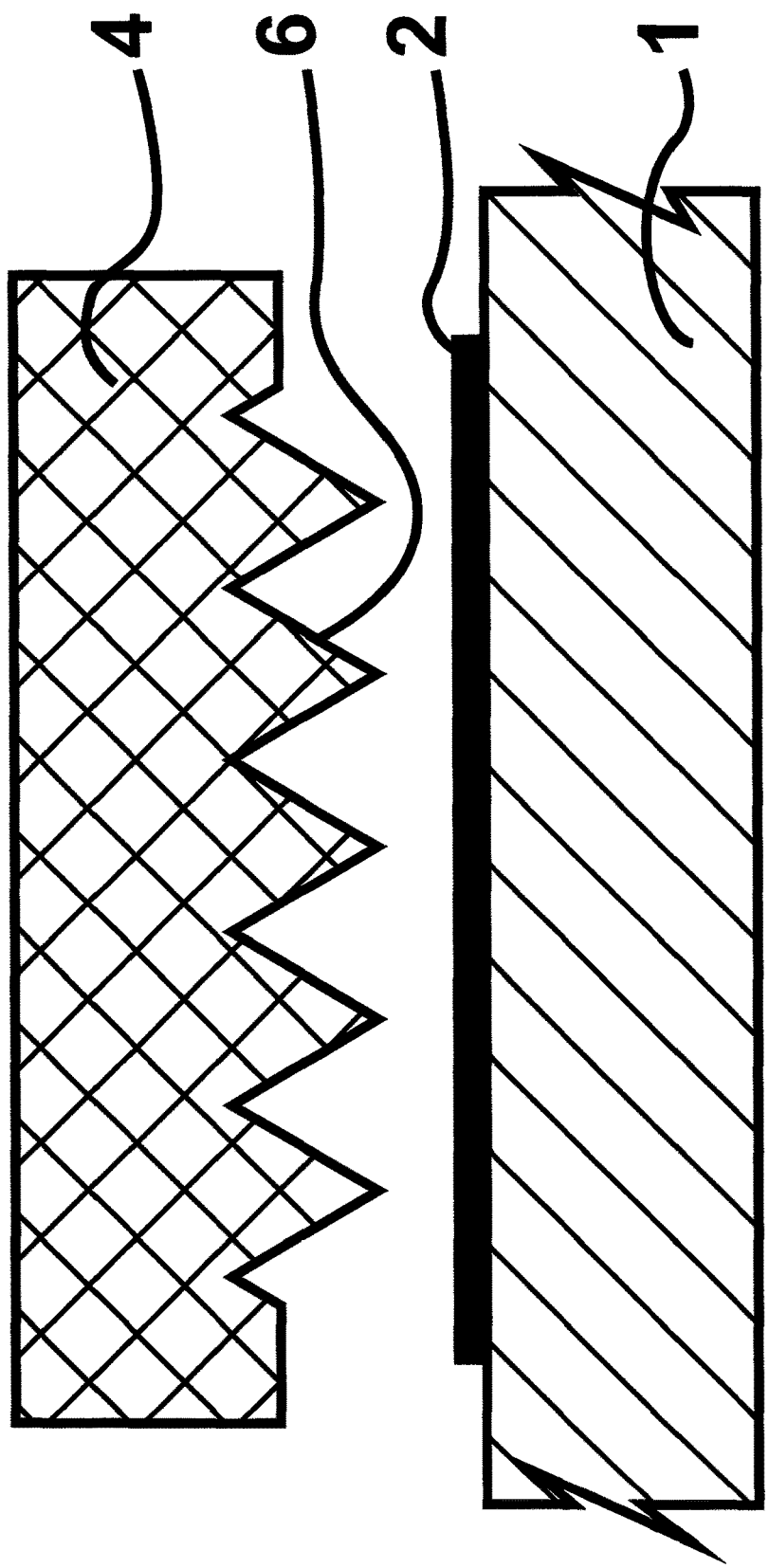
FIGS. 1 to 3 show individual steps in the production of a laminate according to an embodiment of the invention.
Figure 2:
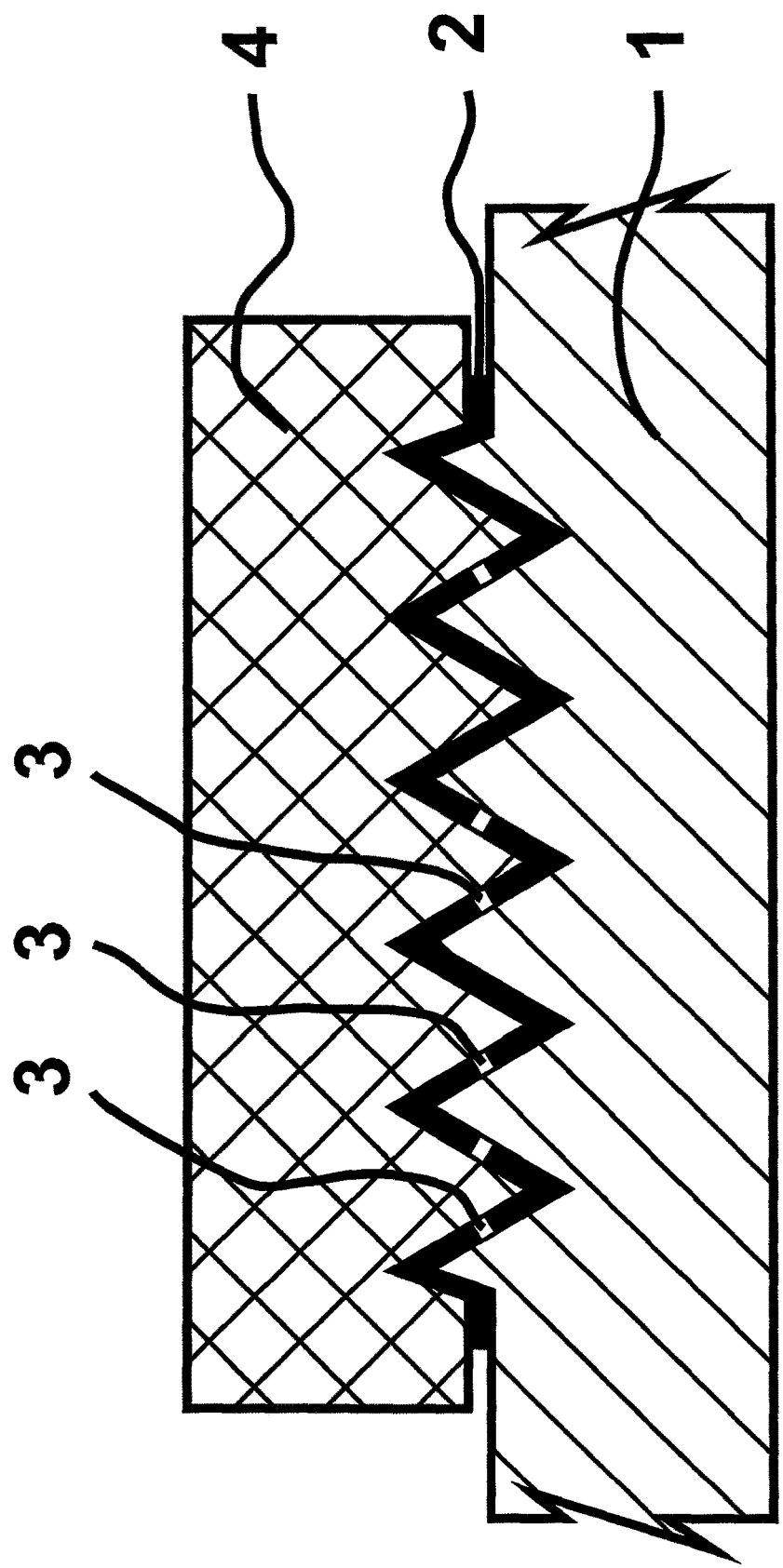
Figure 3:
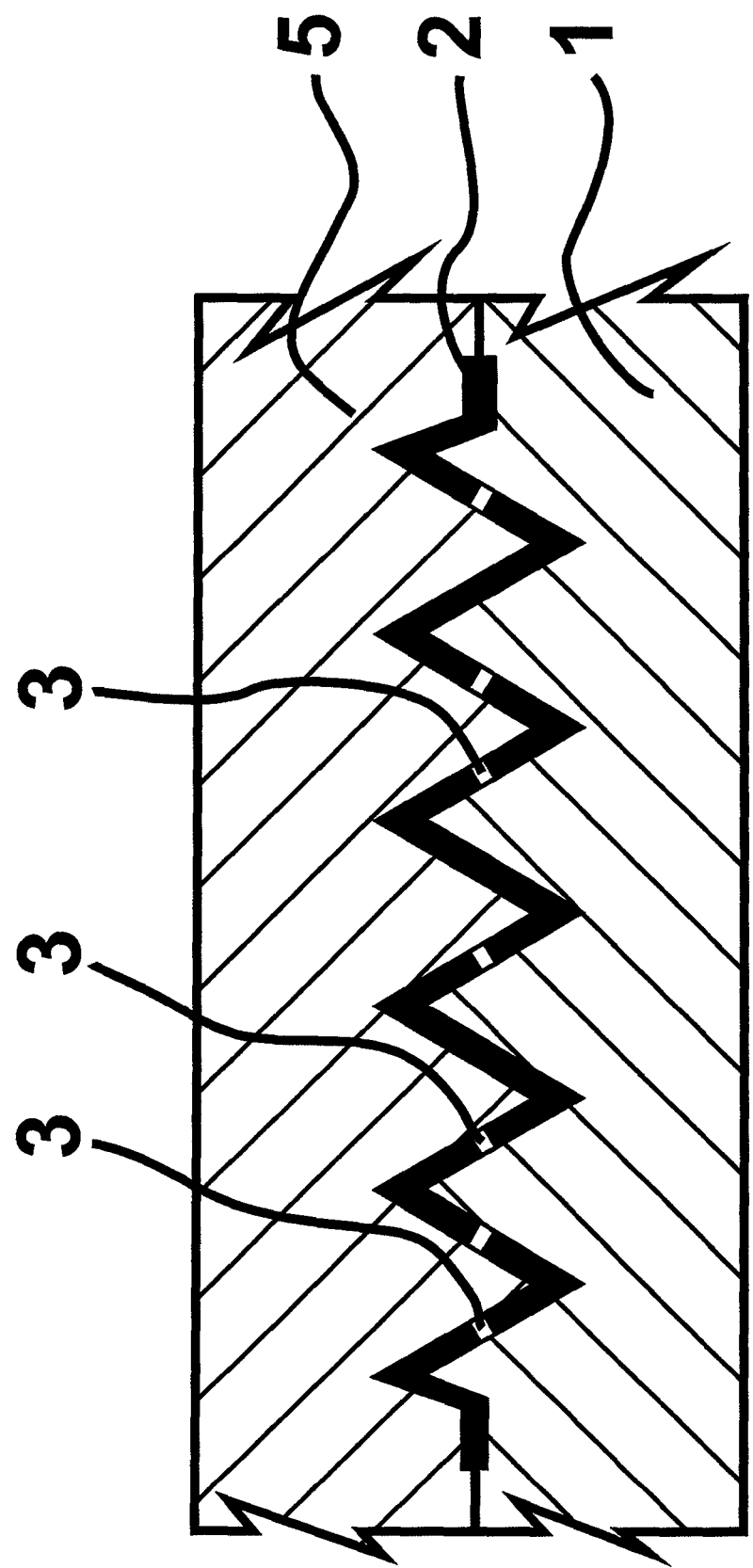

FIGS. 1, 2 and 3 show individual steps in the production of a final laminate comprising two layers 1, 5 of thermoplastic material with a diffractive optical element fixed between them.

First of all, layer 2, whose index of refraction differs from that of layer 1 and/or layer 5 of thermoplastic material, is applied onto pre-selected areas of layer 1, as shown in FIG. 1 (for reasons of simplification, only one of these areas is shown in FIG. 1). In this application, this layer 2 is designated as "layer 2 with a different index of refraction".

Layer 2 with a different index of refraction is created by selective deposition of thin layers of material having a different index of refraction from that of thermoplastic laminate foils, such as metals (e.g. silver, aluminium, copper, chromium, gold, etc), metal alloys or non-metallic materials (e.g. ZnS, $TiO_2$, etc).

Then, stamp 4 with optical diffractive relief 6 in corresponding areas to those of layer 2 with a different index of refraction is imprinted into the layer 2 with a different index of refraction and the carrying layer 1. By imprinting the stamp 4, its relief is transferred to the layer 2 with a different index of refraction (see FIG. 2), thus creating a diffractive optical element whose profile corresponds to that of the optical diffractive relief 6 on the lower side of the stamp 4.

In the next stage, the carrying layer 1 with configured layer 2 having a different index of refraction is covered with a cover layer 5 of thermoplastic material and the resulting laminate is heated to 190° C., thus bonding the cover layer 5 of thermoplastic material with the carrying layer 1 of thermoplastic material.

According to an advantageous embodiment, such a stamp 4 may be used whose optical diffractive relief 6 is, at least in some places, high enough to produce micro-fissures 3 (see FIG. 2) by imprinting the stamp 4 into the layer 2 with a different index of refraction. With the cover layers in place and the entire laminate structure heated up, the micro-fissures 3 allow thermoplastic material to flow therethrough, thereby bonding the cover layer 5 with the carrying layer 1 (see FIG. 3).

Figure 4:
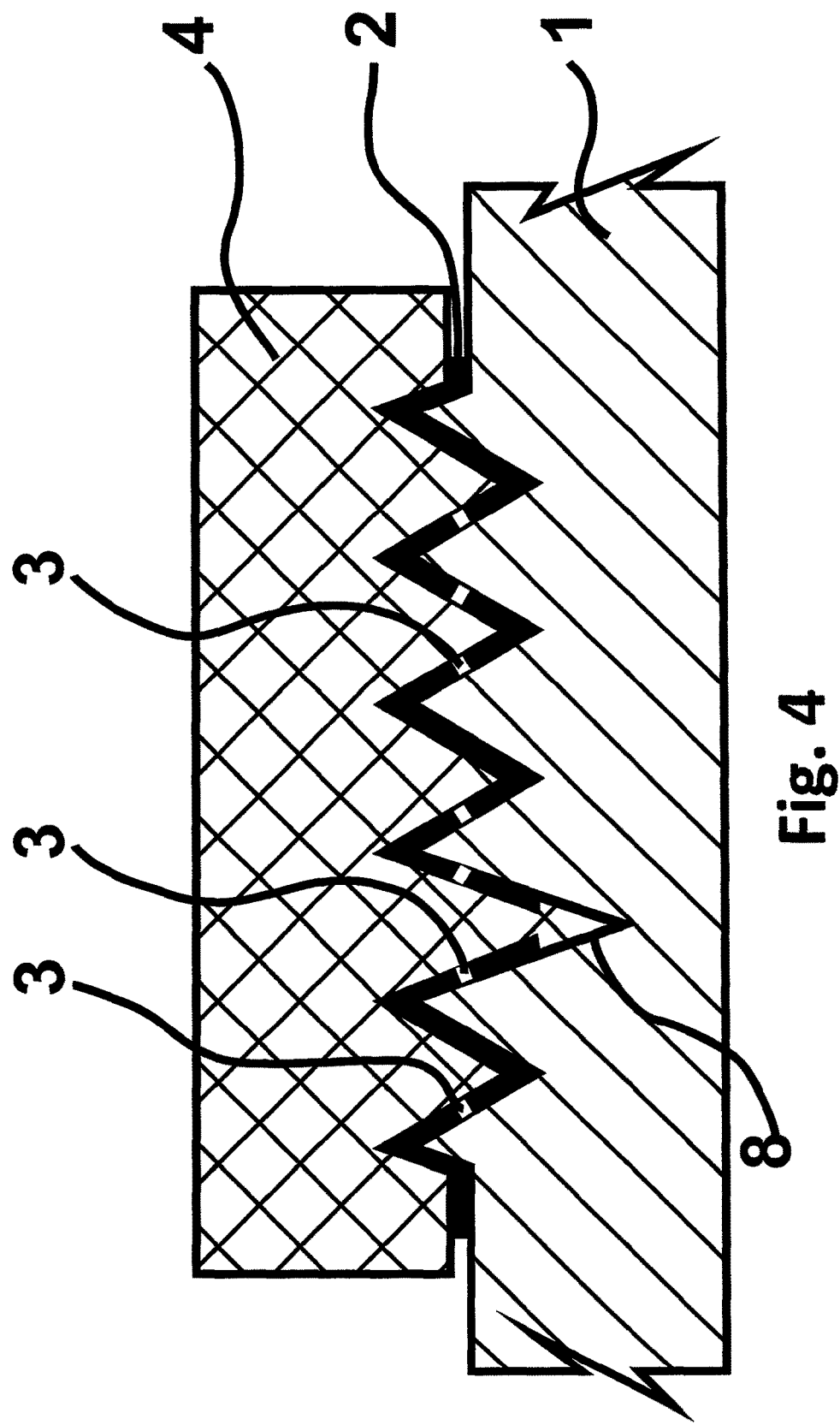
FIG. 4 shows a step of imprinting by a stamp arranged for perforation of the layer with a different index of refraction, in accordance with another embodiment of the invention.

According to another embodiment, such a stamp 4 may be used whose optical diffractive relief 6 has, at least in some places, recesses to produce perforations 8 in layer 2 with a different index of refraction, thus enabling easier bonding of thermoplastic material of the cover layer 5 with the material of the carrying layer 1 (see FIG. 4).

Figure 5:
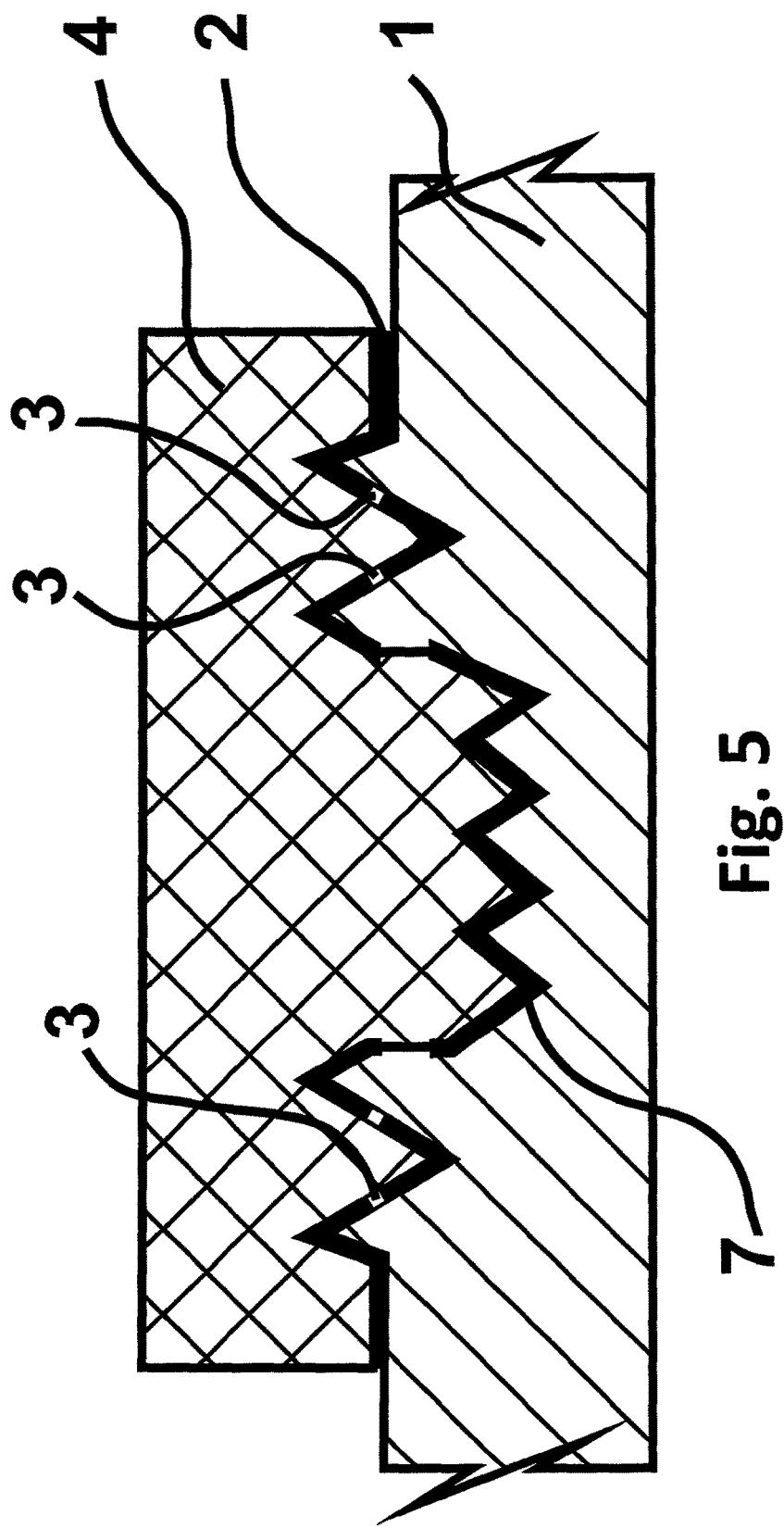
FIG. 5 shows a step of imprinting by a stamp arranged for making parts of the layer with a different index of refraction detached and stepped, in accordance with another embodiment of the invention.
Figure 6:
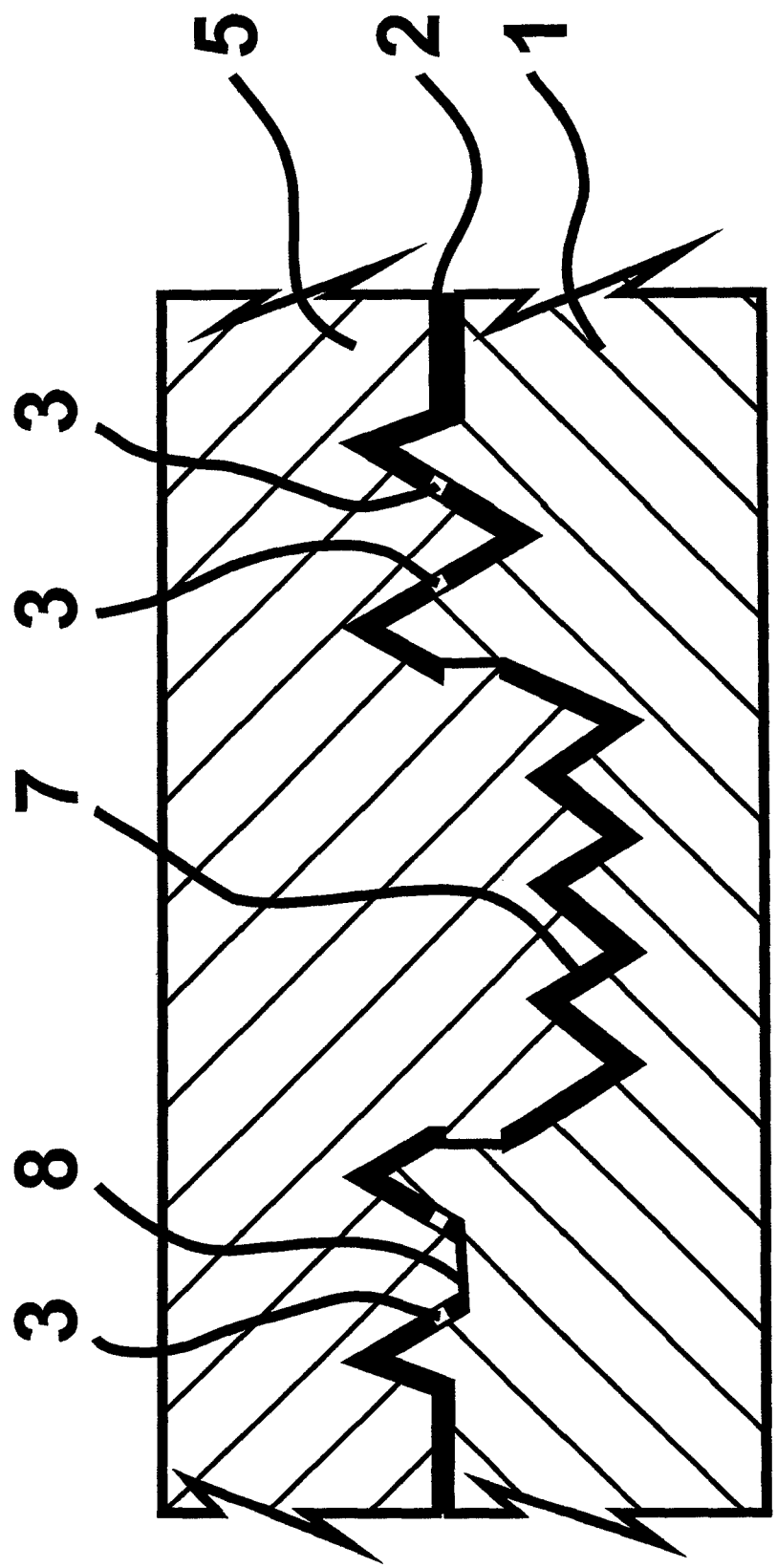
FIG. 6 shows an example of the laminate produced in accordance with the embodiment as illustrated in FIG. 5.

According to another embodiment, such a stamp 4 may be used whose optical diffractive relief 6 is appropriately shaped so as to detach part 7 of the material of the layer 2 having a different index of refraction and with imprinted optical diffractive relief from the imprinted layer 2 with a different index of refraction at some places of the layer 2, and so as to press this part 7 of the material of layer 2 deeper into the carrying layer 1 than non-detached parts of the layer 2 with a different index of refraction (see FIG. 5). Owing to the different heights of the layer 2 with a different index of diffraction constituting the resulting optical diffractive relief, thermoplastic material of the cover layer 5 and the carrying layer 1 (see FIG. 6) flows therethrough during lamination. Height segmentation of the resulting diffractive optical element cannot be seen with the naked eye after finalization of the lamination process. Moreover, since the surfaces are at different heights after lamination, they will come slightly closer together, thus producing optical homogenization of the resulting holographic image, which is not optically segmented, thus avoiding visible fragmentation of the image of the diffractive optical element. Consequently, the maximum visual quality of individual diffractive optical elements fixed at selected points between the carrying layer 1 and the cover layer 5 remains unaffected. Nevertheless, the multi-level structure of such a diffractive optical element can be distinguished when looking at it closely, hence it can be utilized as an additional protective element. This procedure is advantageous, for instance, in manufacturing polycarbonate data pages of passports.

As persons skilled in the art will appreciate, processing of layer 2 having a different index of refraction may be effected using one stamp 4 in one step or using several different stamps 4 in several steps. Several stamps and several steps allow, particularly, the making of perforations 8 in layer 2 with a different index of refraction, or detached parts thereof, as well as effecting the pressing of parts 7 of the material of layer 2 with a different index of refraction deeper into carrying layer 1 than non-detached parts thereof.

An example of the laminate produced according to the method as described above is shown in FIG. 6. This laminate consists of at least two layers 1, 5 of thermoplastic materials with an intermediate layer 2 with a different index of refraction, which layer 2 creates a diffractive optical element. Layer 2 with a different index of refraction has micro-fissures 3, perforations 8 and a detached part 7 formed by imprinting using a shaped stamp 4 with optical diffractive relief 6. Micro-fissures 3, perforations 8 and detached part 7 allow thermoplastic material of layer 5 to flow therethrough, thereby bonding the thermoplastic materials of cover layer 5 and carrying layer 1 together.

INDUSTRIAL APPLICABILITY

The manufacturing procedure for making a laminate in accordance with the invention, as well as the resulting laminate structure, can be used for the production of various identification cards with protective elements provided as diffractive optical elements, credit and debit cards, bank notes, polycarbonate data pages of passports, among other examples.

The invention claimed is:

1. A method of manufacturing a laminate including at least a carrying layer (1) and a cover layer (5) each of thermoplastic material bonded together with a diffractive optical element incorporated between them, the method comprising:

providing a layer (2) having a different index of refraction from that of the carrying layer (1) or the or cover layer (5), and placing the layer (2) having the different index of refraction on the carrying layer (1) of thermoplastic material, wherein the layer (2) with the different index of refraction is placed on one or more, but not all, areas of the carrying layer (1);

subsequently imprinting a stamp (4) with optical diffractive relief (6) thereon into the layer (2) with the different index of refraction; and then placing the cover layer (5) of thermoplastic material on the layer (2) with the different index of refraction; and then heating the resulting laminate to a temperature at which bonding of the cover layer (5) and the carrying layer (1) occurs.

2. The method of manufacturing a laminate according to claim 1, wherein, in the step of imprinting the stamp (4) with optical diffractive relief (6) into the layer (2) with the different index of refraction, the optical diffractive relief (6) of the stamp (4) is, at least in some places, high enough to produce micro-fissures (3) in the layer (2) with the different index of refraction.

3. The method of manufacturing a laminate according to claim 1, wherein, in the step of imprinting the stamp (4) with optical diffractive relief (6) into the layer (2) with the different index of refraction, the layer (2) with the different index of refraction is perforated, at least in some places.

4. The method of manufacturing a laminate according to claim 1, wherein, in the step of imprinting the stamp (4) with optical diffractive relief (6) into the layer (2) with the different index of refraction, a part (7) of the material in the layer (2) with the different index of refraction is detached from the imprinted layer (2) with the different index of refraction, and this detached part (7) of the layer (2) with the different index of refraction is pressed deeper into the carrying layer (1) than non-detached parts of the layer (2) with the different index of refraction.

5. The method of manufacturing a laminate according to claim 1, wherein the layer (2) with the different index of refraction is pressed in a plurality of steps, using different stamps (4).

6. A laminate comprising at least a carrying layer (1) and a cover layer (5) each of thermoplastic material bonded together with an intermediate layer (2) incorporated between them, the intermediate layer (2) having an index of refraction different from that of the carrying layer (1) or the cover layer (5), and the intermediate layer (2) with the different index of refraction constituting a diffractive optical element, wherein the intermediate layer (2) with the different index of refraction constituting the diffractive optical elements includes one or more feature selected from the group consisting of the following: micro-fissures (3), perforations (8) in the intermediate layer (2) with the different index of refraction, and one or more detached parts (7) of the intermediate layer (2) with the different index of refraction and wherein the said thermoplastic material extends through the one or more features selected from the group consisting of the micro-fissures (3), perforations (8) and the one or more detached parts (7) of the intermediate layer (2) with the different index of refraction so as to bond the cover layer (5) with the carrying layer (1).

* * * * *